United States Patent [19]

Hurst et al.

[11] Patent Number: 5,434,907
[45] Date of Patent: Jul. 18, 1995

[54] VOICE MAIL NOTIFICATION SYSTEM

[75] Inventors: Robert L. Hurst, Roseville, Calif.; Steven A. Fernald, Bingham Farms, Mich.

[73] Assignee: Allnet Communication Services Inc., Bingham Farms, Mich.

[21] Appl. No.: 851,056

[22] Filed: Mar. 13, 1992

[51] Int. Cl.[6] .......................................... H04M 1/64
[52] U.S. Cl. ........................................ 379/88; 379/67; 379/207
[58] Field of Search ................... 379/67, 88, 89, 207

[56] References Cited

U.S. PATENT DOCUMENTS

| | | | |
|---|---|---|---|
| 4,162,377 | 7/1979 | Mearns | 379/127 |
| 4,191,860 | 3/1980 | Weber | 379/115 |
| 4,371,752 | 2/1983 | Matthews et al. | 379/89 |
| 4,581,486 | 4/1986 | Matthews et al. | 379/88 |
| 4,602,129 | 7/1986 | Matthews et al. | 379/89 |
| 4,853,952 | 8/1989 | Jachmann et al. | 379/88 |
| 4,932,042 | 1/1990 | Baral et al. | 379/89 |
| 5,008,926 | 4/1991 | Misholi | 379/100 |

*Primary Examiner*—James L. Dwyer
*Assistant Examiner*—Fan Tsang
*Attorney, Agent, or Firm*—Brooks & Kushman

[57] ABSTRACT

A method and system is provided for performing voice mail services in conjunction with a telecommunication service network. The invention specifically discloses a method and system of updating a message count representing the number of pending voice mail messages directed to a telecommunication service subscriber. The invention also discloses a method and system of automatically notifying a telecommunication service subscriber of the number of pending voice mail messages based on the value of the message count. The invention further discloses a method and system of automatically assigning a voice mail box number to a telecommunication service subscriber upon the request of the subscriber.

9 Claims, 5 Drawing Sheets

VOICE MAIL NOTIFICATION SYSTEM

TECHNICAL FIELD

The present invention relates generally to telecommunication systems and, more particularly, to a telecommunication service network with an attached electronic voice mail system.

BACKGROUND ART

Modern telecommunication systems provide subscribers with a number of services. Long distance voice communication, digital communication and conference calling are representative of the available services provided to telecommunication subscribers. More recently, subscribers have been able to take advantage of voice mail services offered through their telecommunication services provider.

The most pertinent prior art regarding voice mail services is U.S. Pat. No. 4,371,752. This patent concerns electronic audio communication systems, in general, but does not address the unique aspects of voice mail services that are offered in conjunction with other telecommunication services.

Currently, the use of a voice mail service that is one of many telecommunication services offered by a provider has certain disadvantages when compared to a voice mail system at an independent interactive voice response system (IVRS). One problem is that since the voice mail service is only one of many, a subscriber may forget to check his voice mail for messages when accessing the telecommunication service. A second related problem is that even if the subscriber remembers to check for the existence of pending voice mail messages, accessing the voice mail service requires additional, sometimes cumbersome and time consuming steps to be taken by the subscriber.

For example, to access voice mail services, a subscriber typically originates a call to a telecommunication service network. The telecommunication service network lists the available services and prompts the subscriber to input a selection of the desired service by pressing a sequence of buttons on the subscriber's telephone unit. Once the telecommunication service system determines that the subscriber wishes to access voice mail services, control of the subscriber's call is transferred to a dedicated IVRS.

Upon receiving control of the subscriber's call, many voice mail systems are programmed to notify the subscriber of the number of pending or undelivered voice mail messages, while other voice mail systems require the subscriber to actively inquire as to the number of pending voice mail messages through the use of the subscriber's telephone unit. In either event, a significant problem exists. In order for a telecommunication service subscriber to receive a notification of the number of pending voice mail messages, the subscriber must take additional steps to access the voice mail system.

A further deficiency of the current integration of voice mail services with telecommunication service systems concerns the creation of new voice mail boxes for subscribers who do not have previously assigned voice mail boxes. Presently, in order for a subscriber to take advantage of voice mail services, he must file a request for an assigned voice mail box or the provider must automatically assign a voice mail box to every subscriber. The first alternative places an unnecessary burden on the subscriber, and the second alternative wastes the provider's resources by assigning voice mail boxes to subscribers who have no interest in using voice mail services.

SUMMARY OF THE INVENTION

The present invention relates to a telecommunication system incorporating a method and system of automatically notifying a telecommunication service subscriber of the number of pending voice mail messages.

The present invention also relates to a telecommunication system featuring a method and system of assigning a voice mail box to a subscriber upon the subscriber's interactive request for access to the voice mail service.

An object of the present invention is to provide a method and system for automatically notifying a telecommunication services subscriber of the number of pending voice mail messages wherein the notification occurs upon the subscriber's access to the telecommunication services system generally, as opposed to the subscriber's specific inquiry to an attached IVRS.

Another object of the present invention is to provide a method and system for automatically updating a subscriber's message count which is accessed by the telecommunication service system. The message count stored by the telecommunication service system is updated whenever the pending message count stored by the voice mail system is altered. This includes instances where additional voice mail messages are recorded and instances where the telecommunication service subscriber retrieves his voice mail messages.

A further object of the present invention is to provide a method and system for automatically assigning a voice mail box to a telecommunication service subscriber upon determining that the subscriber wishes to subscribe to the voice mail system and that a voice mail box had not been previously assigned to the subscriber.

In carrying out the above objects and other objects of the present invention, a first method is provided for automatically updating a message count that is directly accessed by a telecommunication service network. The method includes the steps of modifying a first message count at an IVRS, transmitting the value of the first message count to update a second message count at a service system host computer, and transmitting the value of the second message count to update a third message count at one or more telecommunication host computers.

The modification of the first message count may be caused by a variety of events including recording an incoming message for a subscriber and delivering a pending message to a subscriber.

In carrying out the above objects and other objects of the present invention, a second method is provided for automatically notifying a voice mail subscriber of a message count upon the subscriber's access to the telecommunication service where the message count represents the number of undelivered audio messages stored in a voice mail box assigned to the subscriber. The second method includes the steps of receiving a call from the subscriber, verifying that the subscriber has input a valid identification signal, checking the value of a message count, and upon determining that the value of the message count is greater than zero, providing an audio message notifying the subscriber of the number of audio messages stored in the voice mail box of the subscriber.

In carrying out the above objects and other objects of the present invention, a third method is provided for automatically assigning a voice mail box to a telecommunication service subscriber. The third method includes the steps of testing for the existence of a voice mail box assigned to the subscriber, determining that no voice mail box has been assigned to the subscriber, verifying that the subscriber wishes to have an assigned mail box, assigning a mail box number for the subscriber, transmitting the assigned mail box number to a service system host computer, and updating a subscriber record to reflect the assignment of the voice mail box.

Finally, in carrying out the above objects and other objects of the present invention, a computer-based system is also provided for implementing the above described methods.

The objects, features and advantages of the present invention are readily apparent from the following detailed description of the best mode for carrying out the invention when taken in conjunction with the accompanying drawings.

DETAILED DESCRIPTION OF THE DRAWING FIGURES

Figure 1:
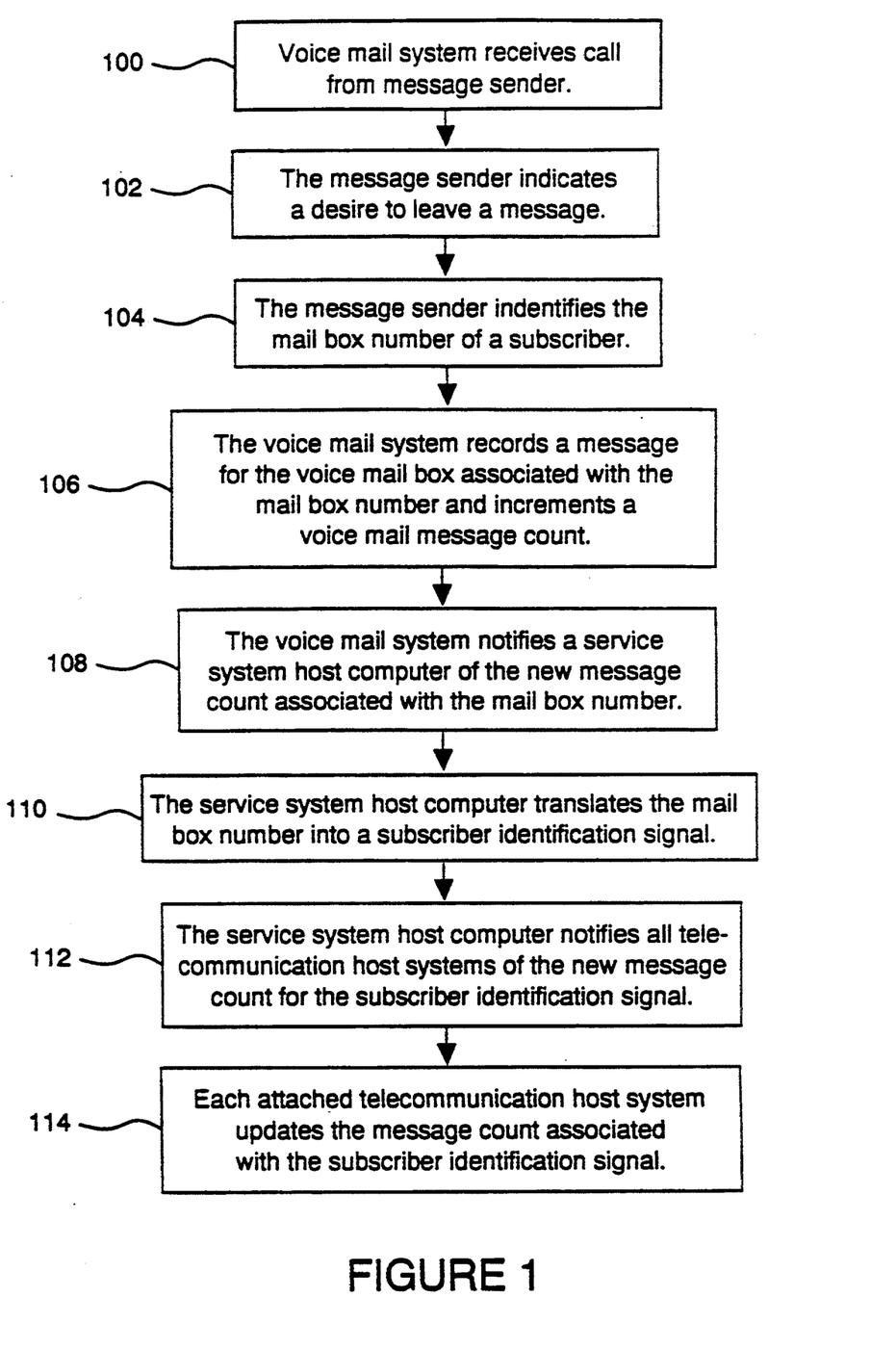
FIG. 1 is a flow chart illustrating a method of updating the message count after a message is left.

FIG. 1 illustrates the preferred method of automatically updating a telecommunication system message count as disclosed by the present invention. FIG. 1 describes the method in the context of a situation in which a message sender leaves a voice mail message for a subscriber.

As block 100 indicates, in the first step, a voice mail system of an interactive voice response system (IVRS) receives a call from the message sender. In the next step, shown by block 102, the message sender indicates a desire to leave a message. Next, block 104 shows that the message sender inputs the mail box number of the subscriber to whom the message is directed.

The voice mail system, as described by block 106, records the message and increments the voice mail message count for the mail box associated with the mail box number provided by the message sender. The voice mail system then transmits the mail box number and the associated message count from the IVRS to the service system host computer as shown by block 108. In block 110, the service system host computer receives the mail box number and translates it to create a subscriber identification signal.

Next, in block 112, the service system host computer transmits the subscriber identification signal and the associated message count to all telecommunication host systems. Finally, block 114 shows that each attached telecommunication host system updates the subscriber's message count.

Figure 2:
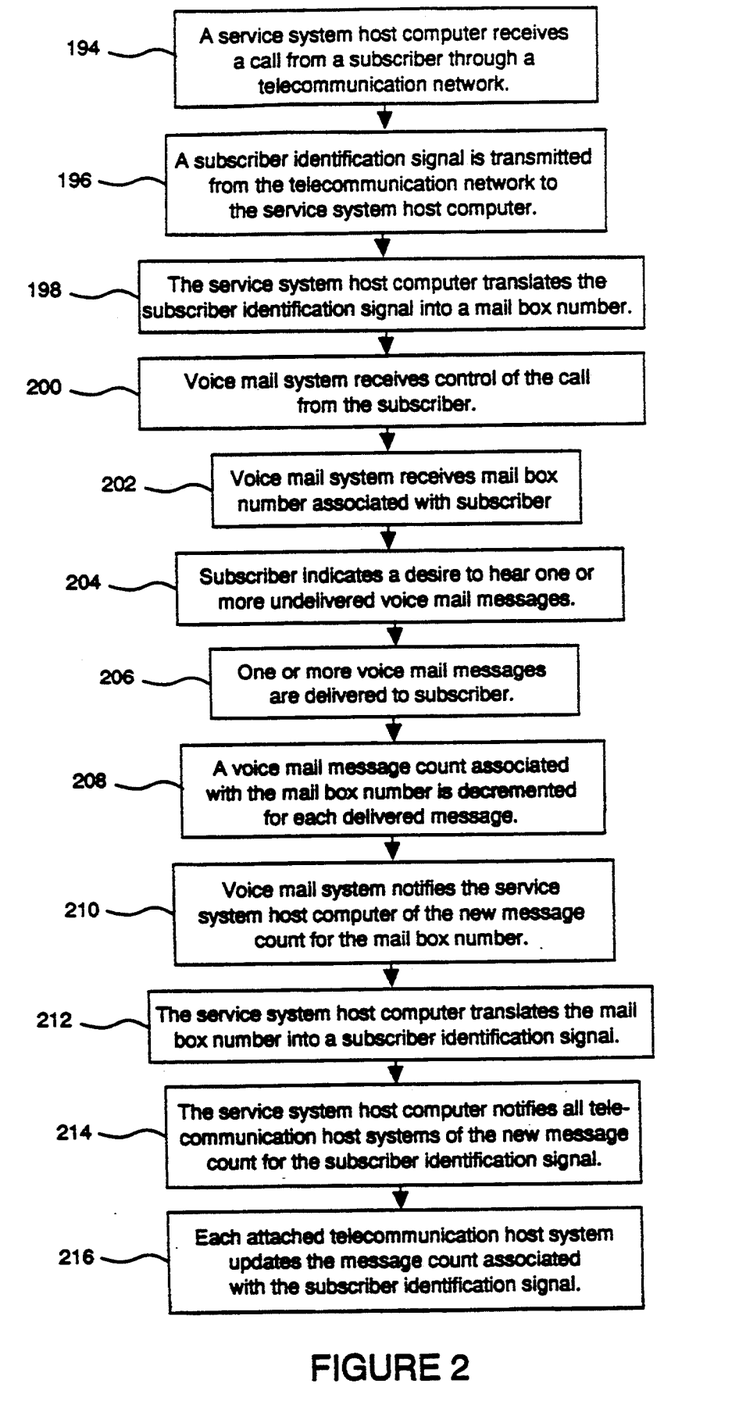
FIG. 2 is a flow chart illustrating a method of updating the message count after a message is delivered.

FIG. 2 illustrates the preferred method of automatically updating a telecommunication system message count as disclosed by the present invention. FIG. 2 describes the method in the context of a situation in which a message sender's voice mail message is delivered to a subscriber.

Block 194 shows the first step in which a service system host computer receives a call from a subscriber through a telecommunication network. Block 196 shows that the subscriber identification signal is transmitted by the telecommunication network to the service system host computer.

In block 198, the service system host computer translates the subscriber identification signal into a mail box number. Block 200 shows the next step in which a voice mail system at an IVRS receives control of the call from the subscriber. Then, the voice mail system receives the mail box number associated with the subscriber from the service system host computer as shown by block 202.

In the next step, shown by block 204, the subscriber indicates a desire to hear one or more undelivered voice mail messages. The voice mail system responds by delivering the voice mail messages to the subscriber per block 206.

The voice mail system, in block 208, decrements a message count associated with the subscriber's voice mail box number for each delivered message. The voice mail system then transmits the mail box number and the associated message count from the IVRS to the service system host computer as shown by block 210. In block 212, the service system host computer receives the mail box number and translates it to a subscriber identification signal.

Next, in block 214, the service system host computer transmits the subscriber identification signal and the associated message count to all telecommunication host systems. Finally, block 216 shows that each attached telecommunication host system updates the subscriber's message count.

Figure 3:
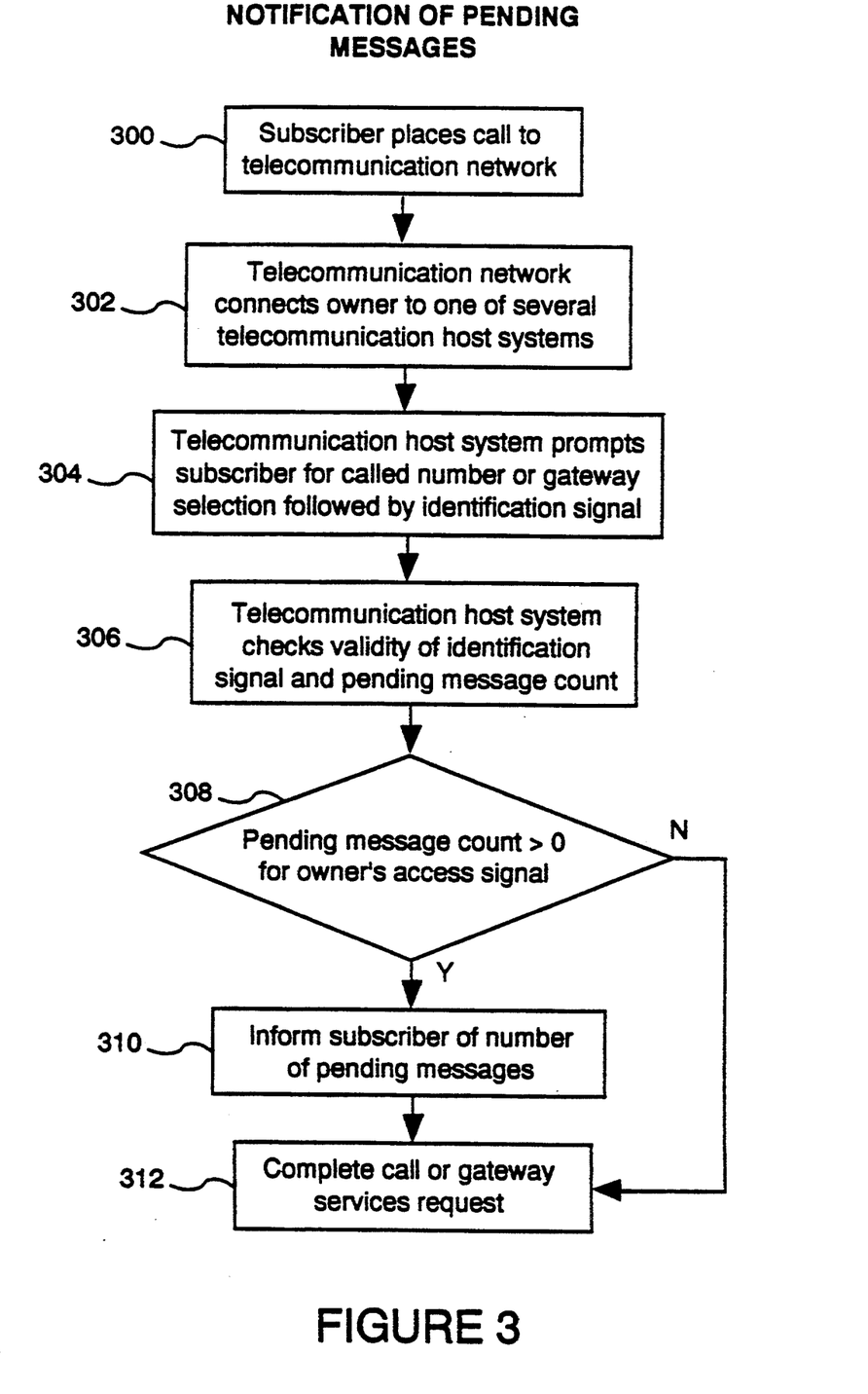
FIG. 3 is a flow chart illustrating a method of notifying a telecommunication service subscriber of the number of pending messages.

FIG. 3 illustrates the preferred method of notifying a subscriber of a message count representing the number of audio messages stored in an assigned voice mail box.

The subscriber initiates the process by placing a call to the telecommunication network per block 300. Block 302 shows that the telecommunication network connects the subscriber's call to the appropriate telecommunication host system. This connection decision is based on the geographic location of the subscriber relative to the telecommunication host system.

Next, according to block 304, the telecommunication host system prompts the subscriber and the subscriber inputs a called number or gateway selection followed by the subscriber's identification signal. The telecommunication host system, in block 306, validates the subscriber's identification signal and checks the value of the pending message count. Decision block 308 determines further action of the telecommunication host system.

If the pending message count is greater than zero, the telecommunication host system processes block 310 and produces an audio message informing the subscriber of the number of pending messages. Finally, the telecommunication host system processes block 312 and completes the subscriber's call or gateway selection identified in block 304.

Figure 4:
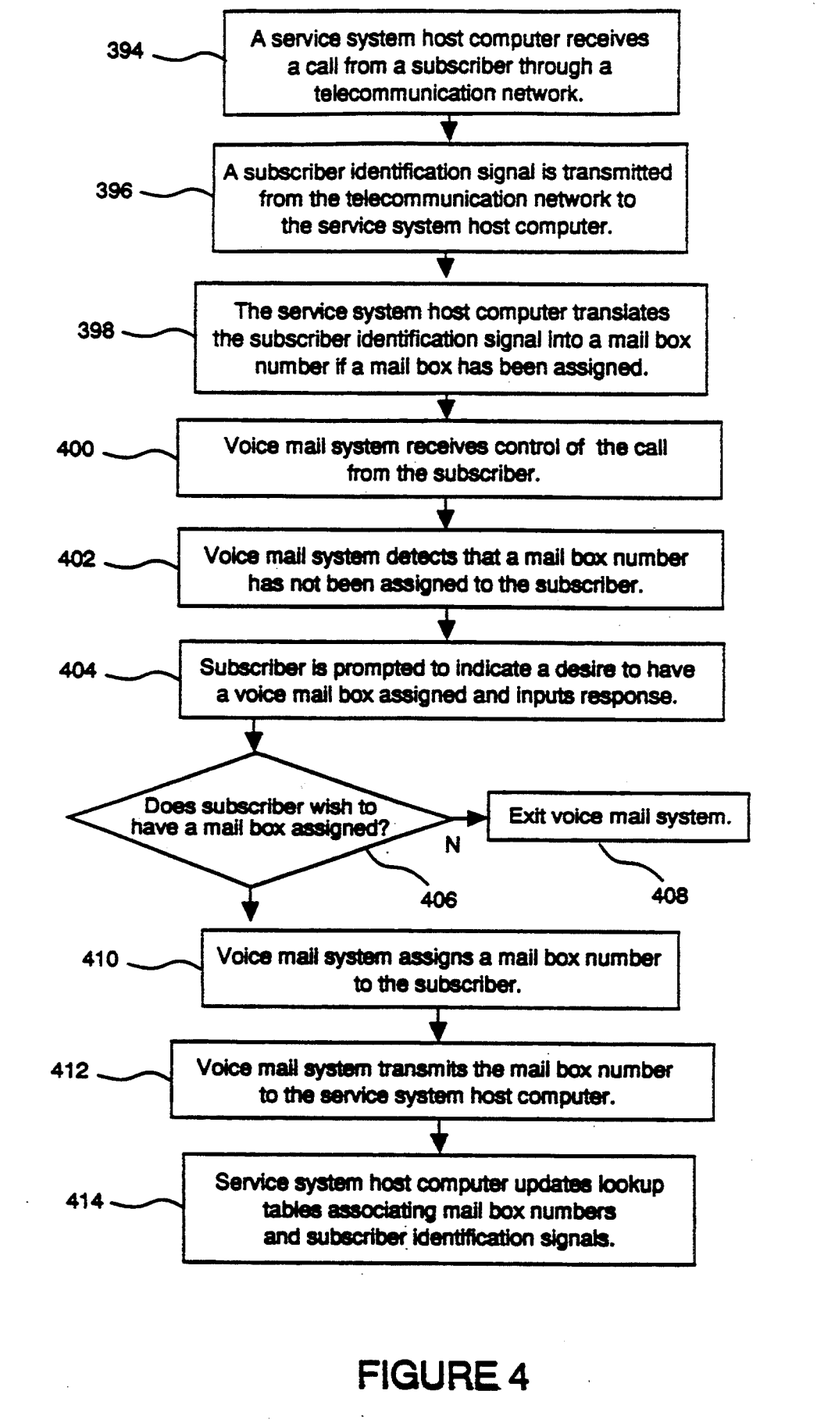
FIG. 4 is a flow chart illustrating a method of assigning a voice mail box to a telecommunication service subscriber upon the subscriber's access to an attached voice mail system.

FIG. 4 illustrates the preferred method of assigning a voice mail box to a telecommunication service subscriber upon the subscriber's access to an attached voice mail system.

Block 394 shows the first step in which a service system host computer receives a call from a subscriber through a telecommunication network. The service system host computer receives a subscriber identification signal from the telecommunication network as shown in block 396.

Block 398 shows the next step in which the service system host computer translates the subscriber identification signal to a mail box number if the subscriber has been assigned a mail box number. Then, as shown by block 400, the voice mail system receives control of the call from the subscriber. In the next step, shown by block 402, the voice mail system detects that a mail box number is not currently assigned to the subscriber.

As shown by block 404, the voice mail system prompts the subscriber and inputs the subscriber's response indicating whether the voice mail system should assign a mail box number to the subscriber. The decision block 406 shows the process flow based on the subscriber's response.

If the subscriber instructs the voice mail system not to assign a voice mail box, control of the subscriber's call is terminated as shown by block 408. On the other hand, block 410 is processed if the subscriber's response indicates that the subscriber wishes to have a voice mail box assigned. In this event, the voice mail system assigns a mail box number representing a voice mail box to the subscriber.

The voice mail system then transmits the mail box number from the IVRS to the service system host computer as shown by block 412. Finally, in block 414, the service system host computer updates all lookup tables which associate mail box numbers and subscriber identification signals to reflect the mail box number assignment.

Figure 5:
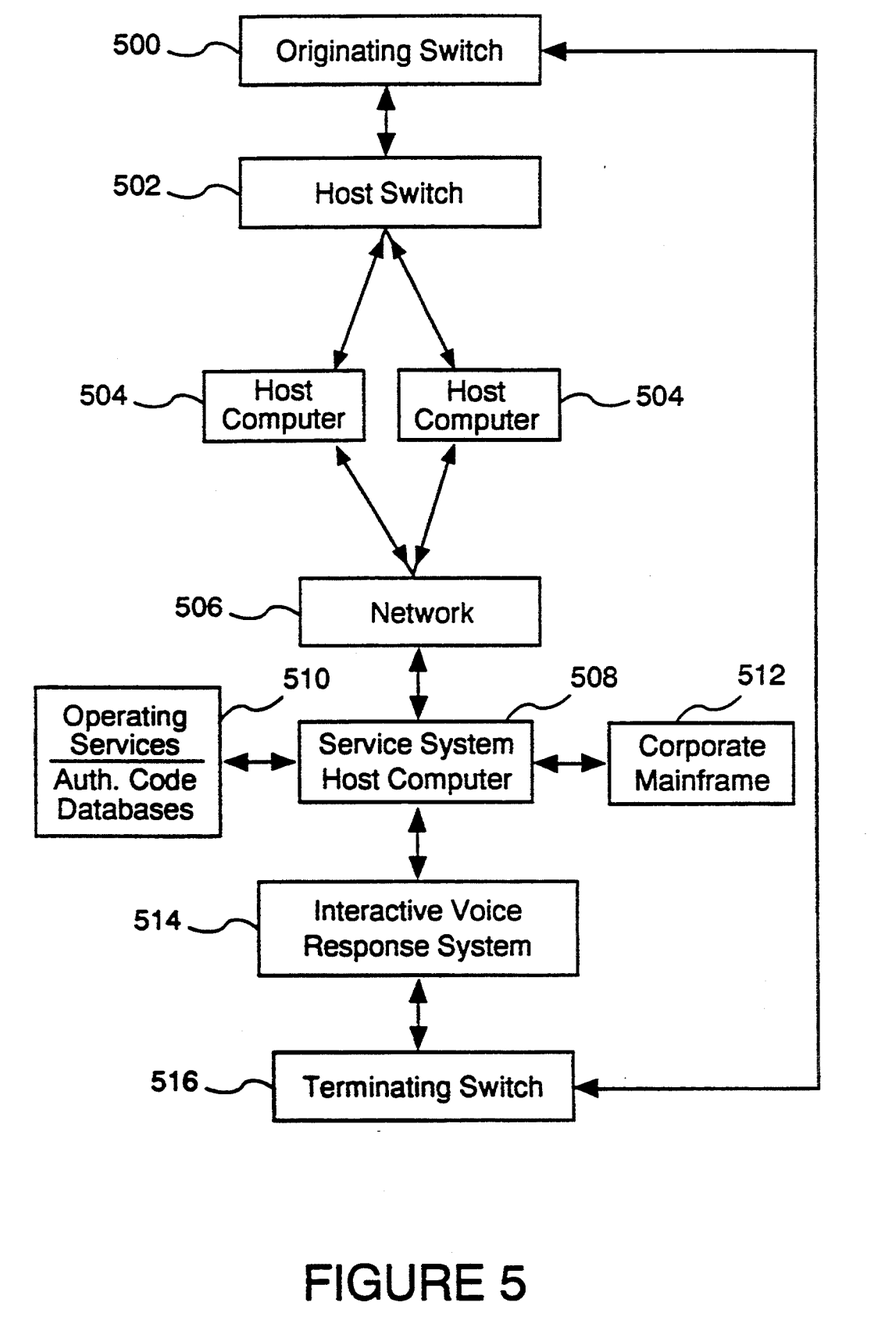
FIG. 5 is a block diagram illustrating the equipment used in the preferred embodiment of the system of the present invention.

FIG. 5 is a block diagram illustrating the equipment used in the preferred embodiment. Incoming subscriber calls are routed to an originating switch 500. The preferred embodiment includes sixteen (16) originating switches 500. The originating switches 500 route each subscriber call to the appropriate host switch 502 which is connected to a pair of telecommunication host computers 504.

There are three (3) telecommunication host switches 502 in the preferred embodiment, and they are Digital Switch Corporation DEX 400 computers. Each telecommunications host computer 504, a Data General MV 9500 computer in the preferred embodiment, has on-line access to copies of the authorization code databases which also resides on the operator service system 510.

Each telecommunication host system 504 is connected to the telecommunication network 506, a Data General Eclipse MV 4000 in the preferred embodiment, which serves as a gateway to the service system host computer 508. In the preferred embodiment, a Tandem non-stop CLX system serves as the service system host computer 508 and is connected to an operator service system 510 which stores a number of authorization code databases. The preferred embodiment utilizes a Data General MV 10000 to function as the operator service system.

The service system host computer 508 is also connected to a corporate mainframe 512 for billing and management functions and to an interactive voice response system 514. In the preferred embodiment, the corporate mainframe 512 takes the form of an IBM computer system.

The interactive voice response system 514 handles voice mail functions and audio communications with subscribers. The interactive voice response system 514 used in the preferred embodiment is a commercially available Computer Communications Specialists FirstLine platform, and it is connected to a terminating switch 516 which is also connected to the originating switch 500.

I claim:

1. A method of automatically updating a telecommunication system message count representing the number of audio messages stored in a voice mail box assigned to a telecommunication service subscriber, the method comprising:

updating a first message count by an interactive voice response system based on activity affecting the number of audio messages stored in the voice mail box assigned to the telecommunication service subscriber;

transmitting a predefined mail box number identifying the voice mail box of the subscriber and the value of the first message count from the interactive voice response system to a service system host computer;

updating a second message count at the service system host computer to equal the value of the first message count received from the interactive voice response system;

translating the mail box number received from the interactive voice response system into a subscriber identification signal;

transmitting the subscriber identification signal and the value of the second message count from the service system host computer to a telecommunication system host computer; and updating the telecommunication system message count associated with the subscriber identification signal to equal the value of the second message count received from the service system host computer.

2. The method as claimed in claim 1 wherein the step of updating a first message count at an interactive voice response system further includes the steps of:

receiving a call at an interactive voice response system from a message sender;

recording an audio message to be stored in the voice mail box of the subscriber; and incrementing the first message count.

3. The method as claimed in claim 1 wherein the step of updating a first message count at an interactive voice response system further includes the steps of:

delivering a pending message to a telecommunications service subscriber; and decrementing the first message count.

4. The method as claimed in claim 1 wherein the telecommunication host computer is one of a plurality of telecommunication host computers connected to a telecommunication computer network, the step of transmitting the subscriber identification signal and the value of the second message count from the service system host computer to a telecommunication host computer further includes the step of:

transmitting the subscriber identification signal and the value of the second message count from the service system host computer to all telecommunication host computers connected to the telecommunication computer network.

5. A system for automatically updating a telecommunication system message count representing the number of audio messages stored in a voice mail box assigned to a telecommunication service subscriber, the system comprising:
- means for updating a first message count by an interactive voice response system based on activity affecting the number of audio messages stored in the voice mail box assigned to the telecommunication service subscriber;
- means for transmitting a predefined mail box number identifying the voice mail box of the subscriber and the value of the first message count from the interactive voice response system to a service system host computer;
- means for updating a second message count at the service system host computer to equal the value of the first message count received from the interactive voice response system;
- means for translating the mail box number received from the interactive voice response system into a subscriber identification signal;
- means for transmitting the subscriber identification signal and the value of the second message count from the service system host computer to a telecommunication host computer; and
- means for updating the telecommunication system message count associated with the subscriber identification signal to equal the value of the second message count received from the service system host computer.

6. The system as claimed in claim 5 wherein the means for updating a first message count at an interactive voice response system further includes:
- means for receiving a call at an interactive voice response system from a message sender;
- means for recording an audio message to be stored in the voice mail box of the subscriber; and
- means for incrementing the first message count.

7. The system as claimed in claim 5 wherein the means for updating a first message count at an interactive voice response system further includes:
- means for delivering a pending message to a telecommunications service subscriber; and
- means for decrementing a first message count.

8. The system as claimed in claim 5 wherein the telecommunication host computer is one of a plurality of telecommunication host computers connected to a telecommunication computer network.

9. The system as claimed in claim 8 further includes:
- means for transmitting the subscriber identification signal and the value of the telecommunication message count to all telecommunication host computers connected to the telecommunication computer network;
- means for updating a plurality of local message counts associated with the subscriber identification signal to equal the value of the telecommunication message count.

* * * * *

UNITED STATES PATENT AND TRADEMARK OFFICE
CERTIFICATE OF CORRECTION

PATENT NO.   :   5,434,907
DATED        :   July 18, 1995
INVENTOR(S)  :   ROBERT L. HURST, STEVEN A. FERNALD It is certified that error appears in the above-identified patent and that said Letters Patent is hereby corrected as shown below:

Column 1, Line 13 (Spec. Page 1, Line 9), after "digital" insert --data--.

Signed and Sealed this

Twenty-eighth Day of November 1995

Attest:

BRUCE LEHMAN

Attesting Officer     Commissioner of Patents and Trademarks